United States Patent [19]
Butcher et al.

[11] Patent Number: 5,456,833
[45] Date of Patent: Oct. 10, 1995

[54] CERAMIC FOAM FILTER HAVING A PROTECTIVE SLEEVE

[75] Inventors: Kenneth R. Butcher, Hendersonville, N.C.; William L. Mountain, Travelers Rest, S.C.; Sara B. Struby, Millbrook, Ala.

[73] Assignee: Selee Corporation, Hendersonville, N.C.

[21] Appl. No.: 236,473

[22] Filed: May 2, 1994

[51] Int. Cl.$^6$ .................................... B01D 39/20
[52] U.S. Cl. .................. 210/488; 210/496; 210/497.2; 210/510.1; 55/523
[58] Field of Search .................. 210/488, 496, 210/497.01, 497.2, 510.1, 490; 510/4, 80, 81; 427/559; 29/DIG. 77; 264/241; 428/325, 403; 55/523, 487

[56] References Cited

U.S. PATENT DOCUMENTS

| | | |
|---|---|---|
| 3,239,323 | 3/1966 | Folweiler . |
| 4,056,586 | 11/1977 | Pryor et al. . |
| 4,092,153 | 5/1978 | Yarwood et al. . |
| 4,411,856 | 10/1983 | Montierth . |
| 4,448,825 | 5/1984 | Asahara . |
| 4,568,595 | 2/1986 | Morris . |
| 4,640,497 | 2/1987 | Heamon . |
| 4,732,593 | 3/1988 | Kondo et al. ............. 55/523 |
| 4,759,892 | 7/1988 | Bonzo . |
| 4,874,516 | 10/1989 | Kondo . |
| 4,923,655 | 5/1990 | Oshima et al. . |
| 4,940,489 | 7/1990 | Cummings . |
| 4,976,760 | 12/1990 | Helferich et al. ........ 55/523 |
| 5,004,545 | 4/1991 | Wahl et al. . |
| 5,021,204 | 6/1991 | Frost et al. . |
| 5,177,035 | 1/1993 | Gee et al. ................. 55/523 |

Primary Examiner—Robert A. Dawson
Assistant Examiner—W. L. Walker
Attorney, Agent, or Firm—Carter & Schnedler

[57] ABSTRACT

There is provided a composite ceramic foam filter having an outer edge which is surrounded by a protective sleeve, with the outer edge of the filter being bonded to the inner surface of the sleeve. The composite is preferably made by forming a ceramic sleeve having an opening therein, and forming a ceramic foam filter of a size and shape to fit the opening in the sleeve; placing the filter into the sleeve opening thereby forming a composite; and drying and firing the composite thereby bonding the filter to the sleeve, resulting in a single piece. Alternatively, a dried foam filter could be placed into the opening of an unfired sleeve and the two pieces are then fired together.

11 Claims, 1 Drawing Sheet

CERAMIC FOAM FILTER HAVING A PROTECTIVE SLEEVE

BACKGROUND OF THE INVENTION

This invention relates to filters for removing impurities from molten metal. More particularly, it relates to ceramic foam filters for providing such metal filtration.

Molten metals usually contain solids such as oxides of the metal and other impurities which may cause the final cast product to have undesirable characteristics.

Filters have been devised to remove these impurities from the molten metal during the cast process. Normally these filters are made of ceramic materials so as to withstand the high temperatures associated with molten metals.

The preferred ceramic filters have a foam-like appearance and are referred to in the metal filtration industry as ceramic foam filters. A ceramic foam filter has a plurality of interconnected open cells which trap the impurities there removing the impurities from the molten metal stream.

The fabrication of a typical ceramic foam filter is described in U.S. Pat. No. 4,056,586 issued to Pryor and Gray and assigned to SELEE Corporation, the assignee of the present invention. The Pryor and Gray patent is hereby incorporated herein by reference. In general, a ceramic foam filter is made by impregnating a open cell hydrophilic flexible organic foam material, such as polyurethane, with an aqueous ceramic slurry. The impregnated organic foam is compressed to expel excess slurry. The material is then dried and fired to burn out the organic materials and to sinter the ceramic coating. A solid ceramic foam is thereby formed having a plurality of interconnecting voids having substantially the same structural configuration as the organic foam which was the starting material.

The resulting ceramic filter may be used to filter molten metal such as aluminum, copper, iron, steel or other cast metal. The filter may be placed in an opening in a wall between a molten metal inlet and a molten metal outlet to filter the material. One example of the placement of a filter in a refractory wall is described in U.S. Pat. No. 4,940,489 issued to Cummings and assigned to SELEE Corporation, assignee of the present invention.

It is often desirable, particularly for foundry applications, that the edges of the ceramic foam filter which are to contact the wall be bonded to a solid ceramic coating as a protective layer. The purposes of this protective layer are to enhance mechanical strength, to prevent the passage of metal between the wall and the filter, to prevent penetration of wax which results during an injection molding operation which may be used when the wall is formed with the filter in place, and to reduce the likelihood that the ends of the ceramic foam filter struts will break off during handling.

Several techniques for forming such solid layer are practiced in the ceramic foam industry. For example, it is common to apply a coating to the ceramic foam filter in its wet, green or its fired state by brushing, spraying or troweling on a ceramic slurry with appropriate binders around the edge of the foam filter. An example of forming a solid layer by coating a filter is described in U.S. Pat. No. 4,568,595 issued to Morris.

In addition, fibrous coatings have been glued on or formed by vacuum-forming techniques. Coatings have also been cast in place.

The techniques referred to above suffer from one or more of the following disadvantages:
1. They tend to be costly;
2. They are difficult to automate;
3. The outer surface created tends to be rough and irregular;
4. The coating material tends to penetrate into the pores of the ceramic foam; and
5. Precise control of the coating dimensions is difficult.

OBJECTS OF THE INVENTION

It is therefore one object of this invention to provide a protective layer for the outer edge of the ceramic foam filter which is easy to control dimensionally and which enhances the mechanical strength of the filter.

It is another object to provide a ceramic foam filter having a protective layer which prevents the passage of wax from an injection-molding operation during the formation of the refractory mold.

It is another object of the invention to provide a ceramic foam filter which has additional structural integrity and which prevents the likelihood of the breakage of ceramic foam struts during handling.

SUMMARY OF THE INVENTION

In accordance with one form of this invention there is provided a method for forming a composite article, including a ceramic foam filter and protective layer. The method includes the steps of:

A. Forming a ceramic sleeve having an opening therein, with the sleeve having an inner surface;

B. Forming a ceramic foam piece having an outer edge surface, said ceramic foam piece being of a size to fit into the opening of the sleeve;

C. Placing the ceramic foam piece into the opening of the sleeve with the outer edge surface of the ceramic foam piece contacting the inner surface of the sleeve, thereby forming a foam/sleeve composite;

D. Drying and firing the composite.

In another form of this invention there is provided a composite article including a ceramic foam filter having an outer periphery surface forming an edge. The filter has a pair of juxtaposed facing surfaces for permitting the entry and exit of molten metal therethrough. A ceramic sleeve having an inner surface is provided and completely surrounds the outer periphery edge surface of the filter. The inner surface of the sleeve is directly bonded to the outer periphery edge surface of the filter.

The resulting article may be directly secured to the wall of a refractory by an injection-molding operation so that the wall is molded about the outer periphery surface of the sleeve with no gaps between the sleeve and the wall.

BRIEF DESCRIPTION OF THE DRAWINGS

The subject matter which is regarded as the invention as set forth in the appended claims, the invention itself, however together with further objects and advantages thereof, may be better understood with reference to the following description, taken in conjunction with the accompanying drawings, in which:

DESCRIPTION OF THE PREFERRED EMBODIMENT

Figure 1:
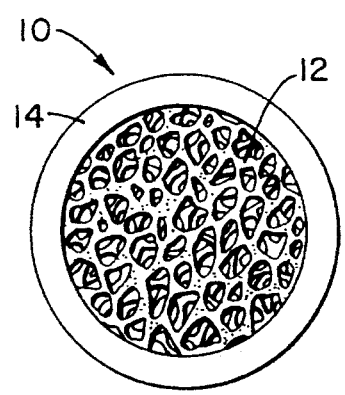
FIG. 1 is a front elevational view of the article of the subject invention.

Referring now more particularly to FIGS. 1 through 4, there is provided composite article 10 including ceramic foam filter 12 which preferably is cylindrical in shape. A tubular-shaped ceramic sleeve 14 surrounds the outer periphery edge 16 of foam filter 12. The outer edge surface 16 of the filter 12 makes contact with the inner surface 18 of sleeve 14.

Figure 2:
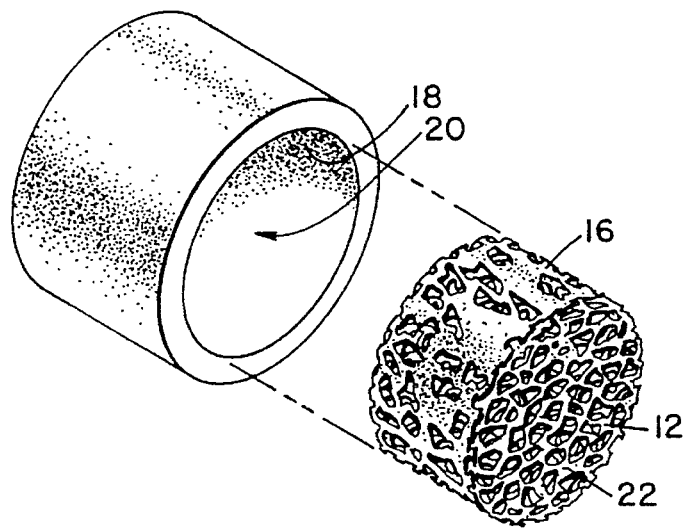
FIG. 2 is a pictorial exploded view of the article of FIG. 1.

The outside diameter of cylindrical filter 12 is substantially equal to the inside diameter of sleeve 18. As shown in FIG. 2, filter 12 may be pressed into the opening 20 of sleeve 14, thereby forming an interference fit between the filter and the sleeve.

Preferably, the filter 12 is pressed into the opening 20 of the sleeve prior to firing the sleeve and the filter, as will be explained below. In the unfired or green state, the filter 12 is spongy and flexible and it is easy to press fit the filter into opening 20.

Alternatively, the filter may be dried prior to being placed into opening 20 of an unfired sleeve, after which the filter and sleeve are fired together.

Referring again to the preferred embodiment, the width of the sleeve 14, i.e., the distance between rim edges 21 and 23, is greater than the width or thickness of the filter 12, i.e., the distance between the juxtaposed exposed faces 22 of the filter element. The more narrow filter 12 is centered between rim edges 21 and 23 of sleeve 14 so that overhangs 24 are provided between the filter faces and the rim edges of the sleeve to provide additional protection for the filter 12, particularly protection for the faces 22 of the filters which might otherwise be damaged during transporting and handling.

As will be explained below, the edge 16 of filter 12 is bonded to the inner surface 18 of the sleeve preferably through simultaneous firing of the composite sleeve/filter, with the bonding generally indicated as 26.

The preferred method to produce the article described above is set forth below.

Sleeve 14 is formed by either extrusion, dry pressing, isostatic pressing, slip casting, or injection molding which are known processes for forming ceramic sleeves. It is preferred that the ceramic sleeve 14 be made of the same materials or compatible materials as the ceramic foam filter 12. One of the preferred ceramic materials is alumina. However, other ceramic materials, such as partially stabilized zirconia, yttria, yttria alumina garnet, silica, mullite, silicon carbide and other refractory materials may be used. In addition, organic binders, such as gums and starches, lubricants, such as waxes and oils, and other forming aids, such as surfactants, may be added to the mixture. In order to obtain the desired shape, one may also dry, cut and machine the sleeve.

Once the sleeve has been formed, it is preferred that it remain in its unfired or green state until after the unfired foam filter 12 has been pressed into opening 20 of the sleeve, although a fully cured or fired sleeve may be used.

The next step in the process is the formation of ceramic foam filter 12. The ceramic foam filter may be formed using a known process such as that described in U.S. Pat. No. 4,056,586 which is referred to above. A ceramic slurry is formed in water containing an amount of a ceramic material, such as alumina. Preferably the particle sizes of the alumina used for forming the filter are larger than the particle sizes of the alumina used for forming the sleeve. A piece of open cell flexible organic foam material, such as polyurethane, having a plurality of interconnecting voids surrounded by a web of the material, is cut to a dimension so as to substantially interference fit within the opening 20 of sleeve 14. The thickness of the organic foam should be slightly less than the width of the sleeve.

Figure 3:
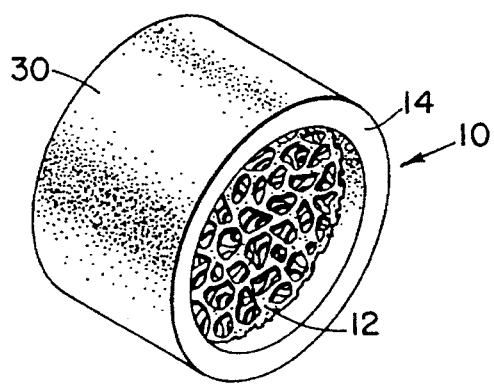
FIG. 3 is a pictorial view of the article of FIG. 1.
Figure 4:
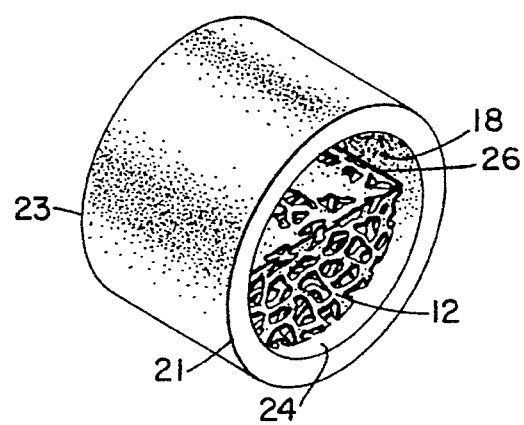
FIG. 4 is a pictorial view of the article of FIG. 3 with portions removed.

The organic foam is then impregnated with the ceramic slurry so that the organic foam is coated therewith and all the voids are filled. The organic foam is then compressed to expel excess slurry therefrom, while leaving the organic foam coated with the slurry. The coated organic foam is then pressed into the opening 20 of sleeve 14. Since the foam is in its unfired state, it is flexible and will readily be received inside of the opening 20 in an interference fit with the opening. The coated outside edge 16 will come in direct contact with the inside wall 18 of the sleeve with the ceramic coating on the sleeve intermixing with the ceramic coating on the foam. The composite structure is then dried and fired. The ceramic slurry on edge 16 of the foam will bond with a ceramic slurry on the inside surface 18 of the sleeve, and after the composite is fired, a single composite integral structure 10 is thereby formed, as shown in FIG. 3.

The heating of the composite will first burn out the flexible organic foam and then it will sinter the ceramic coating for both the filter 12 and the sleeve 14. Thus a fused ceramic foam filter 12 having a plurality of interconnecting voids surrounded by a rigid ceramic sleeve 14 is formed. The composite 10 may readily be used in metal filter applications, with the outside surface 30 of the composite being smooth and regular. The resulting composite has a precise and reproducible dimension. The edges 16 of the foam filter are thus protected from breakage during transport and during installation. In addition, it is preferred that the filter composite 10 be installed utilizing an injection-molding operation which utilizes an amount of wax. The sleeve 14 prevents the penetration of wax into the body of the filter 12 during the injection-molding operation. Furthermore, since there is an overhangs 24 along both sides of the rim of the sleeve 14, the filter faces 22 are protected from damage. The filter of the subject invention eliminates the requirement of the imprecise step of brushing, spraying or troweling on a ceramic slurry along the edges of the filter. Furthermore, the resulting filter prevents the passage of impurities at the interface of the filter and the wall of the refractory.

EXAMPLE 1

A composite filter element 10 was prepared as set forth below.

A round sleeve having an inside diameter of 0.86" and an outside diameter of 11", with a width of 0.61" was formed by dry pressing a mixture of alumina powder and organic binders according to standard industrial practice. The resulting sleeve was left in its green or unfired state. A piece of polyurethane foam was cut in a solid cylindrical configuration to fit the opening in the sleeve. A ceramic slurry was formed using the following ingredients: Alcoa A-16 SG reactive alumina, 39 weight percent; Alcoa A-12 calcined alumina, 39.8 weight percent; Dow Chemical Company MAGCHM 40 (magnesium oxide), 0.06 weight percent; Kiser KSA-250 boehmite, 3.00 weight percent; nitric acid, 1.10 weight percent; and water, 16.2 weight percent. The polyurethane foam was impregnated with the resulting ceramic slurry. The foam was then compressed to remove approximately 84% of the slurry therefrom. The impregnated foam was inserted into the opening in the sleeve. The resulting composite was dried for a period of ½ hour at a temperature of 100° F. The dried composite was then fired in an oven at a temperature of 1550° C. for a period of 48 hours.

EXAMPLE 2

The composite filter produced in accordance with Example 1 was placed in a refractory mold. There was no evidence of any wax penetrating into the filter 12. There was no gap between the outside surface 30 of the sleeve and the refractory wall. There was no gap between the edge 16 and wall 18. There was a complete bond between the edge 16 of foam filter 12 and the inner wall 18 of sleeve 14. The filter element composite was used to filter molten nickel/iron (super alloy) at a temperature of 1650° C. for a time period of 45 seconds to form a cast article. After the article was formed, the composite filter was removed and there was no evidence of any deterioration of the filter and there was no evidence of any cracking of the sleeve or the filter. Pressure was applied to the filter 12 in an attempt to remove the filter for the sleeve by breaking the bond 26. The filter crumbled and the bond 26 was not broken. The resulting article formed in the super alloy cast process did not show any evidence of impurities therein.

The invention may be embodied in other forms or carried out in other ways without departing from the true spirit and essential characteristics thereof. For example, other materials and geometries may be used. The present embodiment is therefore to be considered in all respects illustrative and not restrictive, the scope of the invention being indicated by the appended claims, and all changes and other embodiments which come within the meaning and range of equivalencies are intended to be embraced therein.

We claim:

1. A composite ceramic article comprising:
   a ceramic foam filter having an outer periphery surface forming an edge, said filter having a pair of juxtaposed facing surfaces for permitting the entry and exit of molten metal therethrough; and
   a ceramic sleeve having an inner surface completely surrounding said outer periphery surface of said filter, said inner surface of said sleeve directly bonded to said outer periphery surface of said filter; said sleeve having an outer periphery surface; the distance between the outer periphery surface of said sleeve and the inner surface of said sleeve being substantially uniform, whereby the thickness of said sleeve is substantially constant.

2. An article as set forth in claim 1, wherein said inner surface of the sleeve and said edge of said filter is devoid of adhesive.

3. An article as set forth in claim 1, wherein said filter and said sleeve are cylindrical in shape.

4. An article as set forth in claim 1, wherein said sleeve and said filter are fired together after said filter has been inserted into said sleeve.

5. An article as set forth in claim 1, wherein the ceramic material forming said sleeve and said filter is taken from the group consisting of alumina, zirconia, yttria, silica, mullite, silicon carbide and yttria alumina garnet.

6. An article as set forth in claim 1, wherein said sleeve includes an organic binder and lubricants.

7. An article as set forth in claim 1, wherein said outer periphery surface of said sleeve is substantially smooth.

8. An article as set forth in claim 1, wherein the ceramic from said sleeve does not penetrate into the outer periphery surface of said filter.

9. An article as set forth in claim 1, wherein the firing shrinkage of said sleeve is greater than the firing shrinkage of said filter.

10. A composite ceramic article comprising:
    a ceramic foam filter having an outer periphery surface; said filter having a pair of juxtaposed facing surfaces for permitting the entry and exit of molten metal therethrough; and
    a ceramic sleeve having a pair of opposing edges; said sleeve having an inner surface completely surrounding said outer periphery surface of said filter, said inner surface of said sleeve directly bonded to said outer periphery surface of said filter; the distance between said opposing edges across said inner surface of said sleeve is greater than the distance between said juxtaposed facing surfaces of said filter, thereby forming a pair of regions adjacent to said edges of said sleeve which overhang said juxtaposed facing surfaces of said filter for protecting said juxtaposed facing surfaces of said filter.

11. A composite ceramic article comprising:
    a ceramic foam filter having an outer periphery surface forming an edge, said filter having a pair of juxtaposed facing surfaces for permitting the entry and exit of molten metal therethrough; and
    a ceramic sleeve having an inner surface completely surrounding said outer periphery surface of said filter, said inner surface of said sleeve directly bonded to said outer periphery surface of said filter, wherein said sleeve is formed with ceramic particles which are smaller than the ceramic particles used to form said filter, whereby the firing shrinkage of said sleeve is greater than the firing shrinkage of said filter.

* * * * *